United States Patent [19]

Toshiyuki

[11] Patent Number: 5,136,506
[45] Date of Patent: Aug. 4, 1992

[54] SYSTEM FOR CONTROLLING THE DISPLAY OF DATA RELATED TO THE STATUS OF INPUT DATA INCLUDING PREVENTION OF STATUS DATA UPDATES IF THE SPEED AT WHICH DATA IS INPUT EXCEEDS AN ESTABLISHED LIMIT

[75] Inventor: Sakai Toshiyuki, Nagoya, Japan

[73] Assignee: Brother Kogyo Kabushiki Kaisha, Aichi, Japan

[21] Appl. No.: 381,145

[22] Filed: Jul. 17, 1989

[30] Foreign Application Priority Data

Jul. 18, 1988 [JP]  Japan .................. 63-178534

[51] Int. Cl.⁵ .............................. G06F 15/20
[52] U.S. Cl. ...................... 364/419; 340/711; 340/748
[58] Field of Search ............. 364/419, 236.8, 929.12; 340/711, 724, 748, 798

[56] References Cited

U.S. PATENT DOCUMENTS 4,428,065  1/1984  Duvall et al. .

FOREIGN PATENT DOCUMENTS

0259957A2 of 0000 European Pat. Off. .

OTHER PUBLICATIONS

Communication (search report) IBM Technical Disclosure Bulletin vol. 28 No. 11 Apr. 1986.

Primary Examiner—Gail O. Hayes
Attorney, Agent, or Firm—Kane, Dalsimer, Sullivan, Kurucz, Levy, Eisele and Richard

[57] ABSTRACT

A text editing device capable of representing on a display a variable pertaining to inputted data in response to movement of a cursor on the display screen as the data is inputted. The device is further provided with a controller which prevents the representation of the variable from changing if data is inputted and hence the cursor moves at a speed greater than a predetermined value.

13 Claims, 10 Drawing Sheets

SYSTEM FOR CONTROLLING THE DISPLAY OF DATA RELATED TO THE STATUS OF INPUT DATA INCLUDING PREVENTION OF STATUS DATA UPDATES IF THE SPEED AT WHICH DATA IS INPUT EXCEEDS AN ESTABLISHED LIMIT

BACKGROUND OF THE INVENTION

This present invention relates to a text editing device having a function for displaying text data under preparation and relational data corresponding to the position on a display, for example, a scale line corresponding to a print pitch when the text data are printed, or a numeral representation corresponding to a volume of data stored in memory or a volume of data capable of being stored, i.e. a memory space remaining for an additional storing of data.

As disclosed, for example, in U.S. Pat. No. 73729 (filed on Jul. 15, 1987), this kind of a device displays a cursor indicating a position where data is inputted on text data displayed on a display and a scale cursor on a scale line indicating a character position of a print out corresponding to this cursor position.

With this text editing device, for example a word processor, an operator can prepare a text while confirming a character position in printing for the effective preparation of the text. Since, however, the scale cursor is conventionally shifted each time the cursor is shifted, a longer period of time is necessary to shift the cursor, and thus when character data or a cursor shift instruction is inputted at a high speed by operating a keyboard at a high speed, a problem arises in that the cursor cannot be shifted corresponding to the input operations and sometimes the data cannot be inputted at the high speed.

Further, in the word processor it is required that a cursor displayed on a display screen is smoothly and quickly moved in case a space repeat mode is selected, that is, the cursor must be quickly moved in response to a successive input operation of a space code or a backspace code.

More specifically, this text editing device is arranged so that data inputted through the keyboard is temporarily stored in a buffer and the buffered input data is sequentially read out to be subjected to processing corresponding to the input data, and thus when the device takes a long time to effect the processing for shifting the cursor, the speed for reading out the input data from the buffer is lowered. Then, when data is stored in the buffer at a high speed by operating the keyboard at a high speed, much data is accumulated in the buffer and additional data cannot be inputted due to saturation of the buffer.

Further, in the word processor having the function for storing a plurality of character data and space data and the like and displaying a numeral representation corresponding to the volume of data being stored in a memory or capable of being stored in a memory, it is required that the numeral representation is varied in response to a variation of the volume of data caused by a successive input operation of data. Since the time for the calculation processing required for varying numeral representation is wasted, the movement of the cursor on the display screen ceases during each input operation of data, therefore, the cursor movement operation is discontinuously executed and the space repeat operation is not smoothly and quickly executed. The above disadvantage obviously appears in case a liquid crystal display unit having a long response time for represent operation is employed as a display unit, or the complicated calculation processing is employed for processing a large volume of data. Further, it is impossible for an operator of the word processor to separately discriminate each varying of the numeral representation even if the successive move operation of the cursor is able to be executed.

SUMMARY OF THE INVENTION

It is therefore an object of the invention to provide an improved text editing device capable of representing relational data which has a predetermined relationship with an input position on a display screen and controlling a changing of the relational data on the screen so as not to change in case the input position is moved on the screen at intervals of time less than a predetermined time.

An another object of the present invention to provide an improved text editing device capable of varying a numeral representation discontinuously in response to a successive variation of a memory capacity executed by, for example, a space repeat operation.

For this purpose, according to one aspect of this invention, there is provided a text editing device comprising input means for inputting character data, represent means for representing characters in response to the inputted data, input position designate means for arbitrarily designating the position at which a character data is to be inputted on the represent means, and means for moving the input position designated by the input position designate means on the represent means, the text editing device further comprises: relational data represent means for representing relational data having a predetermined relationship with the input position designated by the input position designate means; first control means for controlling the relationship data represented by the relational data represent means so as to be varied in response to a movement of the input position executed by the move means: and second control means for controlling the relational data represented by the relational data represent means so as not to be varied in case the input position is successively moved by the move means at intervals of time less than a predetermined value.

According to another aspect of this invention, there is provided a text editing device comprising input means for inputting character data, represent means for representing characters in response to the inputted data, cursor position designate means for arbitrarily designating the cursor position at which a character data is to be inputted on the represent means, and memory means for storing the data inputted through the input means, the text editing device further comprises: move means for moving the cursor with each data input operation executed by the input means on the represent means; data volume represent means for representing the volume of data stored in a part of the memory means corresponding to the line on which the cursor is located or a volume of data capable of being stored in the part of the memory means in a numeral representation; first control means for controlling the representation of the data volume represent means so as to be varied by a moving operation of the cursor caused by the input operation executed by the input means; and second control means for controlling the volume of the data represented by the data volume represent means so as to be discontinuously varied at an interval of time corresponding to a predetermined number of moving operations of the cursor in case the cursor is moved faster than the numeral representation of the data volume represent means is varied.

DESCRIPTION OF THE ACCOMPANYING DRAWINGS

FIGS. 4, 4(A) and (B) are flowcharts of a text preparing processing executed by the electronic control unit of FIG. 2;

DESCRIPTION OF THE EMBODIMENTS

An embodiment of this invention will be described below with reference to drawings.

Figure 1:
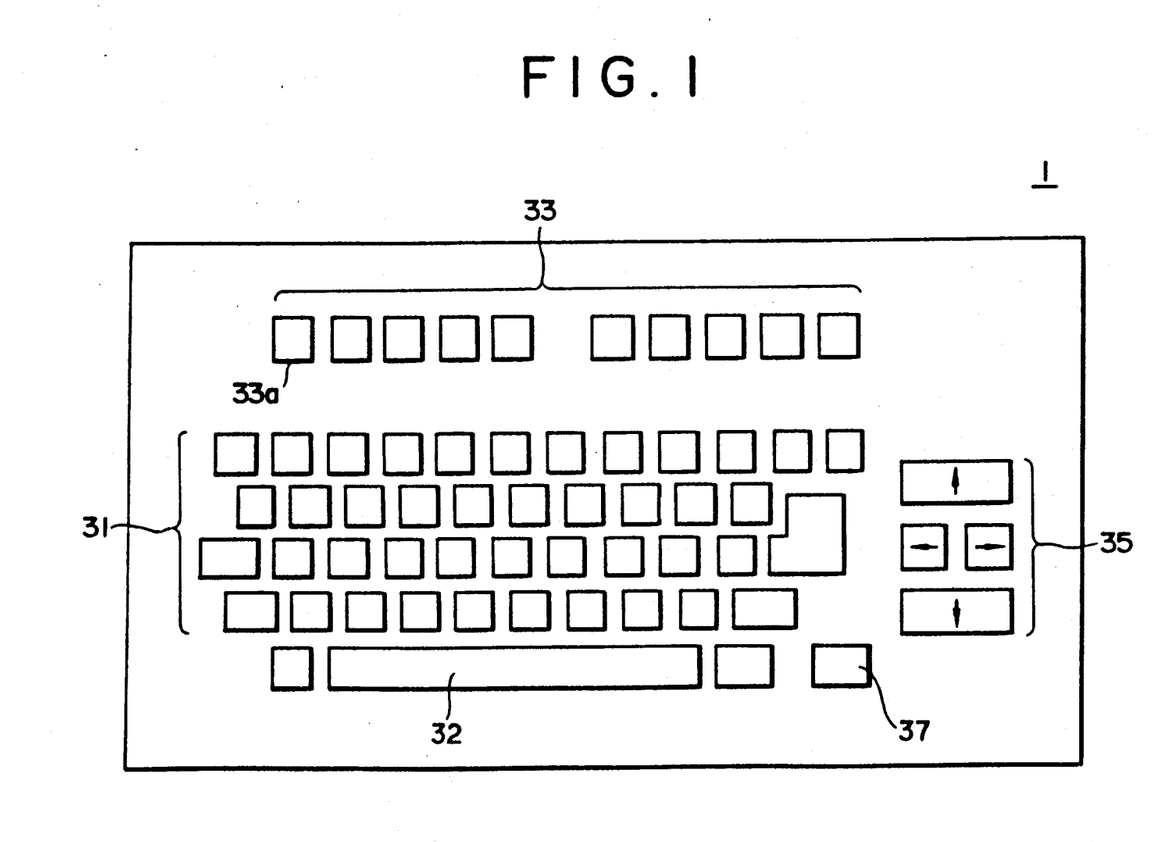
FIG. 1 is an illustrative view showing a key arrangement of a keyboard provided on a word processor as a text editing device embodying the present invention.

FIG. 1 is an illustrative view showing an arrangement of a keyboard provided on a word processor as a text editing device embodying the present invention.

The keyboard 1 is provided with character keys 31 for inputting the character data corresponding to the characters and symbols, various instruction keys 33 for inputting instruction codes for text editing. printing and the like of a text, cursor movement keys 35 for moving a cursor 100 on a display 3, space key 32 for inputting a space code having a function for automatically inputting a code corresponding to a space at predetermined intervals of time by being depressed continuously, a repeat key 37 for inputting previously inputted data again and the like.

Figure 2:
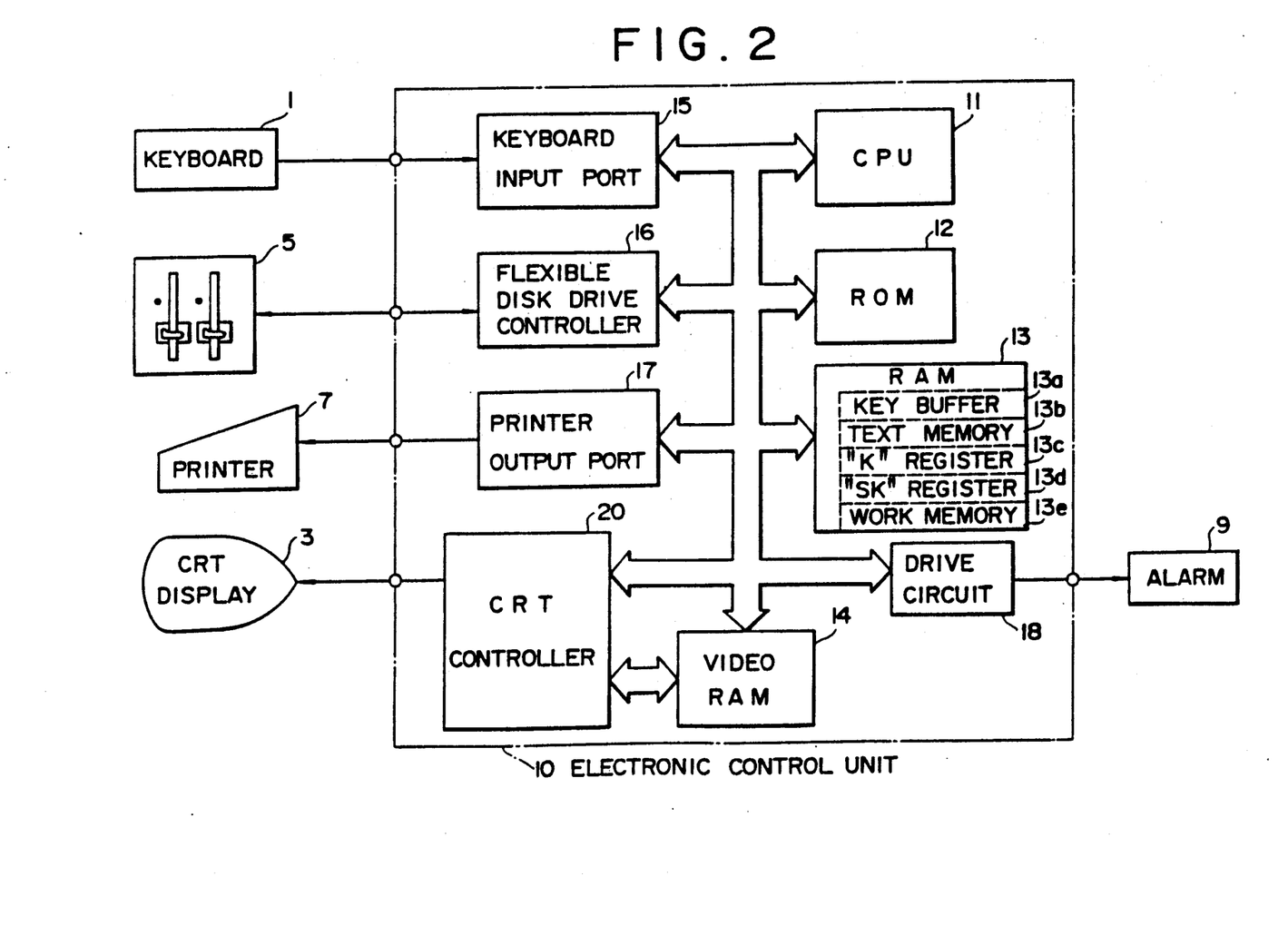
FIG. 2 is a block diagram of an electronic control unit provided on the text editing device embodying the present invention.

FIG. 2 is a schematic diagram illustrative of an overall arrangement of a text editing device as an embodiment to which the present invention is applied.

As shown in FIG. 2, the text editing device of this embodiment comprises the above described keyboard 1, a CRT (Cathode Ray Tube) display 3 for displaying text data, a scale line, and the like, a flexible disk drive 5 as an external recording unit, a printer 7 for printing the text data, a buzzer 9 as an alarm unit for alerting an abnormal state to an operator, an electronic control unit 10 electrically connected to these units for controlling the preparation, display and print of a text and the like.

The electronic control unit 10 is composed of a logical operation circuit including a known CPU (Central Processing Unit) 11, ROM (Read Only Memory) 12, RAM (Random Access Memory) 13 and the like as a main part, a video RAM 14 for recording data to be displayed on the CRT display 3, a keyboard input port 15 for effecting data input operation from the keyboard 1, a flexible disk drive controller 16 for reading/writing data by controlling the flexible disk drive 5, a printer output port 17 for outputting print data to the printer 7, a drive circuit 18 for actuating the buzzer 9 to notify the abnormal state to the operator and the like.

The RAM is provided with a key buffer 13a for temporarily storing data inputted from the keyboard 1, a text memory 13b for storing the text data, a "K" register 13c for storing the present position of the cursor 100, a "SK" register 13d for storing the present position of a scale cursor 200, and a work memory 13e for temporarily storing data for the edit of a text. The ROM 12 stores a control program for effecting the preparations, display, print and the like of the text and initial data.

On the other hand, the video RAM 14 is composed of a dual port RAM and thus can be also accessed by a CRT controller 20 provided independently of the CPU 11. The CRT controller 20 repeatedly reads out the contents of the video RAM 14 in the cycle determined by the scanning frequency of the CRT display 3 and displays them thereon. Therefore, the character data written into the predetermined area of the video RAM 14 by the CPU 11 is displayed on the CRT display 3 at once.

This arrangement enables the operator to prepare the text by depressing the character keys 31, to edit and print the text as necessary as well as to write the text data stored in the text memory 13b of the RAM 13 to the flexible disk set to the flexible disk drive 5 through the flexible disk drive controller 16. Note, the instruction keys 33 of the keyboard 1 include a print pitch change key 33a for changing the print pitch of the character data when the text data is printed thereby to enable a scale line 250 to be displayed in the CRT display 3 to be changed according to the print pitch.

Figure 3:
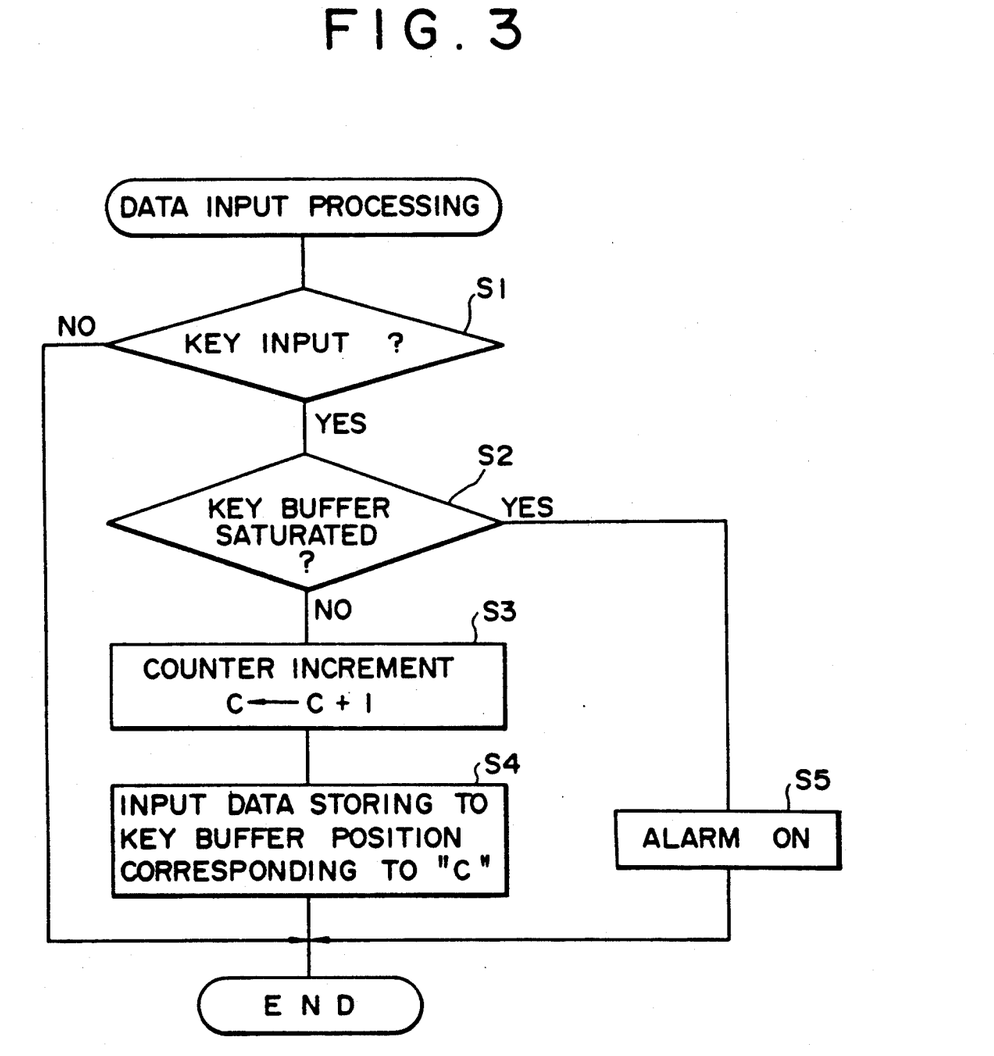
FIG. 3 is a flowchart of a data input processing executed by the electronic control unit FIG. 2.

With this text editing device of the embodiment arranged as described above, data input processing is executed every predetermined period of time (e.g., 2 msec.) as shown in FIG. 3 and thus the data inputted from the keyboard 1 is stored in the key buffer 13a.

More specifically, in this data input processing, a key scanning is carried out to determine whether the operator effects a key input or not (step S1). When the key input is effected, the input data is stored in the key buffer 13a in such a procedure that it is confirmed that the key buffer 13a is not saturated (step S2-YES), a counter "C" showing an amount of data stored in the key buffer 13a is incremented (step S3) and the input data is stored in the storing location corresponding to the value of the counter "C" (step S4). When it is determined at step S1 that the key input is not effected, the succeeding processings are not necessary to be executed, and then the flow is terminated. Further, when it is determined that the key buffer 13a is saturated at step S2, since the input data cannot be stored in the key buffer 13a, the buzzer 9 is actuated to notify this state to the operator (step S5) and the flow is terminated.

Note that the process at step S1 to determine whether the input operation is effected or not is carried out in such a manner that when a repeat key 37 or a key having a self repeat function (the space key 32 and the cursor movement keys 35 in this embodiment) is continuously depressed, it is regarded that a repeat instruction is effected by a new input operation each time the key is depressed for a predetermined period of time (e.g., 0.1 sec.) and the flow goes to step S2, and when a key other than above is continuously depressed, it is regarded that an input operation is not effected and the flow is terminated.

Figures 4, 4B:
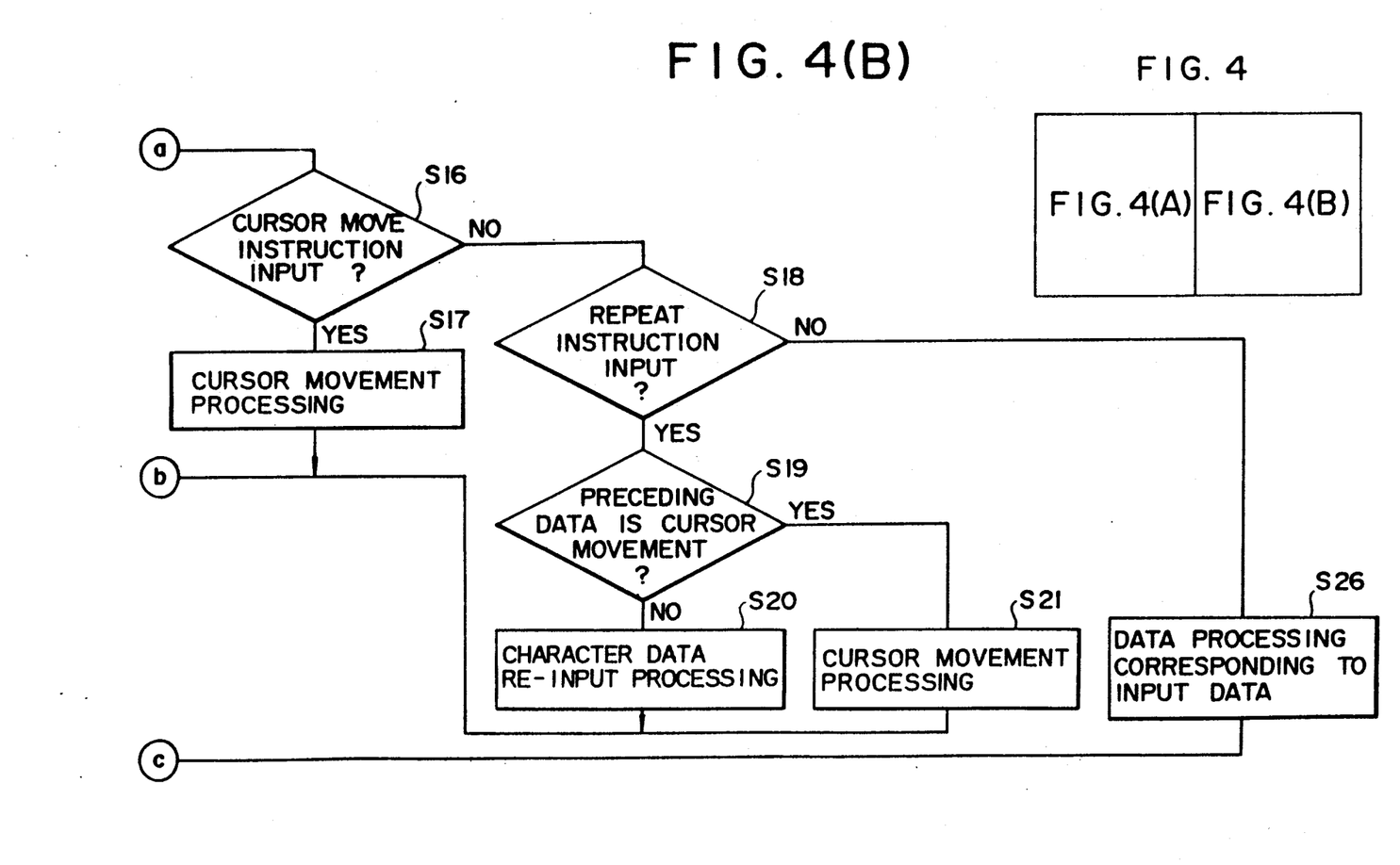
Figure 4A:
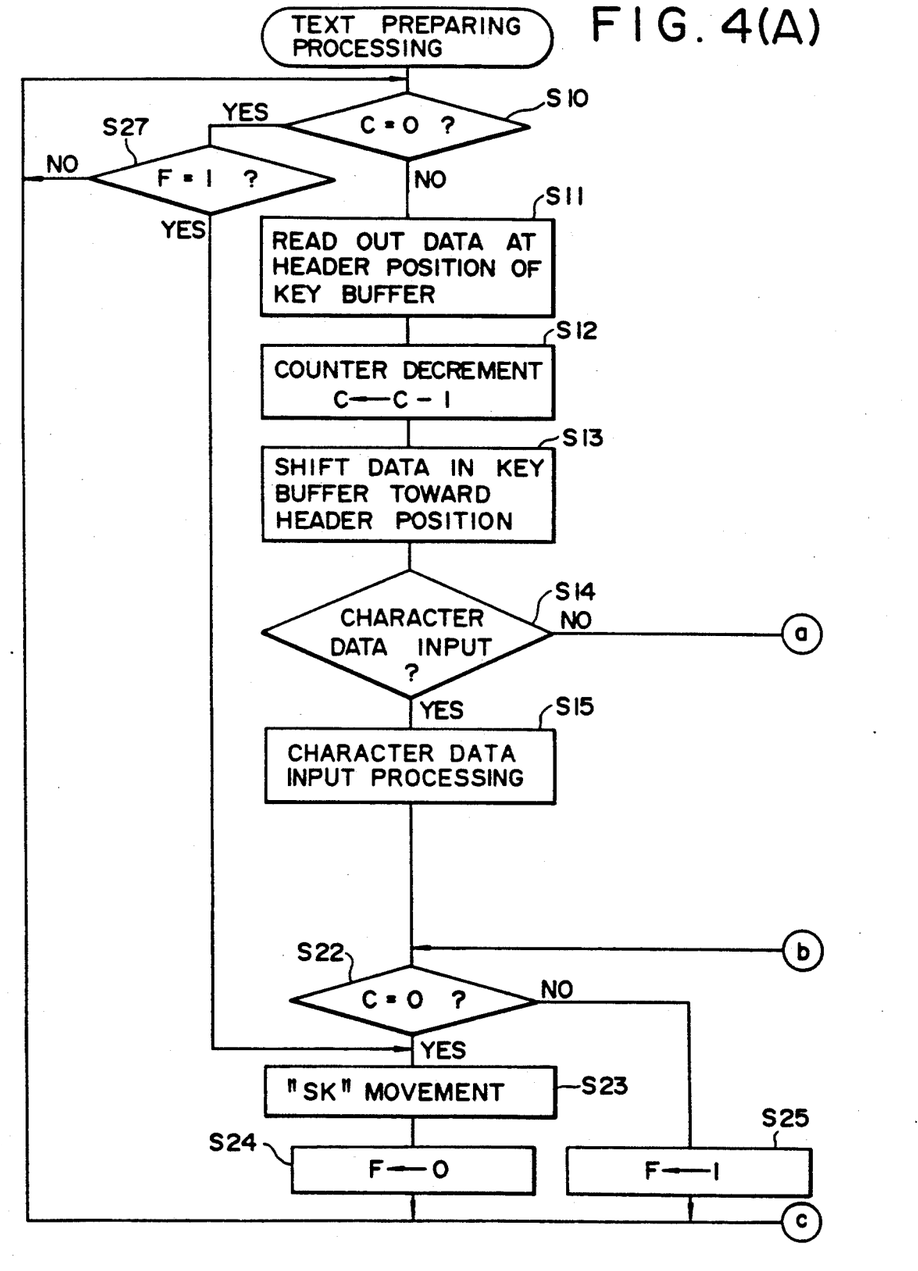
Figure 5A:
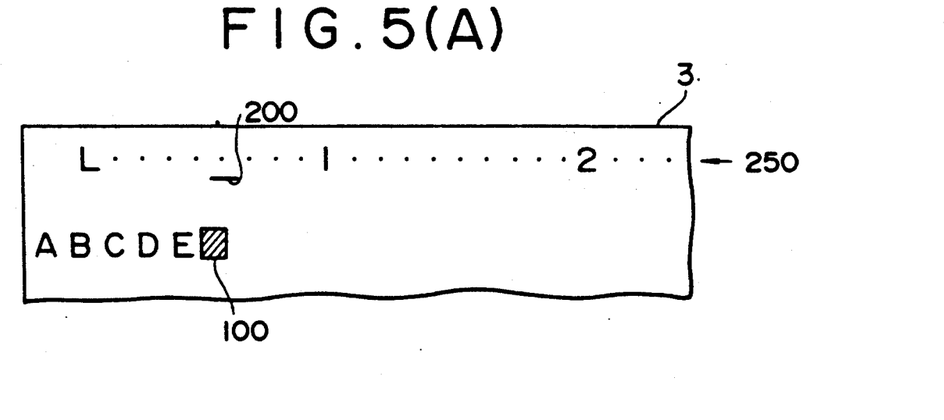
FIG. 5(A) through 5(C) are explanatory views of a data movement on a display in case that the processing shown in FIG. 4 is executed.
Figure 5B:
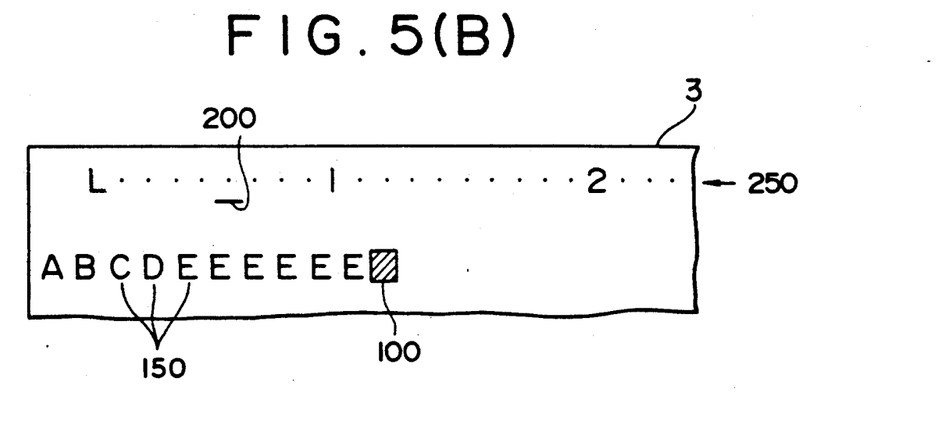
Figure 5C:
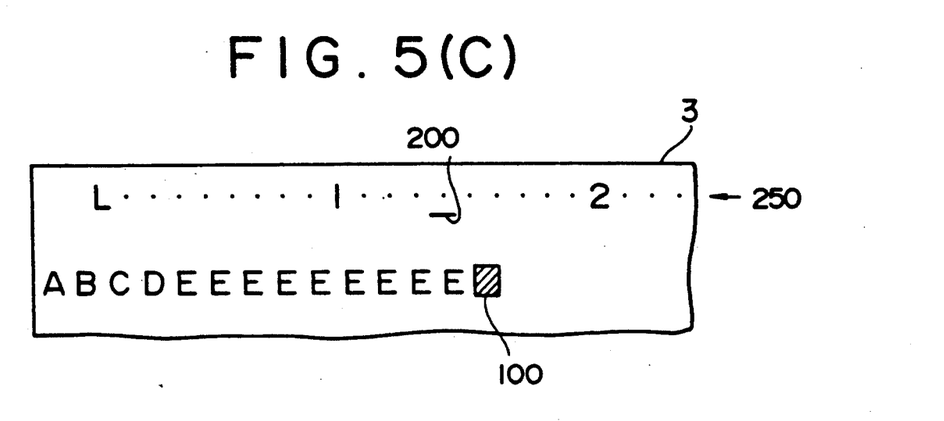

Next, FIG. 4(A) and 4(B) show a text preparing processing repeatedly executed when the device is in a text preparing mode. Note that this processing rewrites the contents of the video RAM 14 each time data is inputted through the keyboard 1 and, as shown in FIG. 5(A) through 5(C), displays on the CRT display 3 text data under preparation, the cursor 100 indicating a data input position on the text data, the scale line 250 corresponding to a print pitch set in advance by the print pitch change key 33a, and the scale cursor 200 corresponding to the cursor position on the scale line 250 as well as stores the text data edited in the text memory 13b and updates them when an input line is shifted on the text data and the like.

As shown in FIG. 4(A) and 4(B), when the text preparing processing starts, a processing at step S10 is primarily executed to determine whether the value of the counter "C" is zero or not, i.e., inputted data is stored in the key buffer 13a or not. When it is determined that the value of the counter "C" is not zero and the key buffer 13a stores the input data at step S10, the flow goes to step S11 where the inputted data stored at the header data storing position in the key buffer 13a is read out, the value of the counter "C" is decremented at step S12, the inputted data in the key buffer 13a is shifted in the header direction to change the location where the data are stored at step S13, and then the flow goes to step S14. At step A14, it is determined whether the inputted data read out at step S11 is character data (including space data). When the inputted data are the character data, the flow goes to step S15 where a character data input processing is executed wherein the input character data is displayed at the cursor position on the display, the cursor is shifted to the next data input position and the "K" register 13a is incremented.

Next, when it is determined that the input data is not the character data at step S14, the flow goes to step S16 where it is determined whether the inputted data is a cursor shift instruction given by the operation of one of the cursor movement keys 35 or not. When the inputted data is the cursor key shift instruction, the flow goes to step S17 where a cursor shift processing is executed wherein the cursor position on the display is shifted in the direction corresponding to the cursor shift instruction by one character and the "K" register 13c is incremented.

When it is determined at step S16 that the inputted data is not the cursor shift instruction, the flow goes to step S18 where it is determined whether the inputted data is a repeat instruction or not given by the operation of the repeat key 37 or the continuous operation of the key having the self repeat function. When the input data is the repeat instruction, it is determined at step S19 whether data input just before the repeat instruction was a cursor shift instruction given one of the cursor movement keys 35. When the result of the determination is not affirmative, i.e., the data input just before was character data, the flow goes to step S20 where a character data re-input processing is executed wherein previously input character data is displayed at a present cursor position, the cursor position is shifted to the next data input position, and the "K" register 13c is incremented. When the result of the determination is affirmative at step S19, the cursor shift processing is executed again at step S21 wherein the cursor position on the display is shifted in the direction corresponding to the cursor shift instruction by one character and the "K" register 13c is incremented.

Note that when it is necessary to further shift the cursor 100 in the same direction which already arrives at a margin position in the processing executed at step S15, S17, S20 or S21, the cursor 100 is shifted to the opposite margin position of the previous or next line. More specifically, for example, when the cursor 100 is arrives at the right margin, it is shifted to the left margin of the succeeding line.

When the cursor 100 is shifted on the text data as described above at step S15, 17, 20 or 21, the flow goes to step 22 where it is determined whether the value of the counter "C" is zero or not, i.e., data still remains in the key buffer 13a or not. When the value of the counter "C" is zero and no data remains in the key buffer 13a, the flow goes to step 23 where a scale cursor shift processing is executed wherein the scale cursor 200 is shifted according to the cursor position on the text data so as to cause the value of the "SK" register 13d to coincide with the value of the "K" register 13c. Next, at succeeding step S24 a flag "F" is reset to indicate that the scale cursor 200 corresponds to the cursor position, and then the flow goes to step S10 again.

Conversely, when it is determined at step S22 that the value of the counter "C" is not zero, i.e., data remains in the key buffer 13a, the scale cursor shift processing is not executed at step S23, the flag "F" is set and the flow goes to step S10 again. More specifically, when the data remains in the key buffer 13a, data is continuously inputted from the key board 1 and the cursor 100 must be continuously shifted on the display 3, and thus the processing for shifting the scale cursor 200 is not executed and the next inputted data is read as it is.

When it is determined at step S18 that the input data is not the repeat instruction, the input data is a kind of text edit instructions, and thus the flow goes to step S26 to execute a data processing corresponding to the input data and goes to step S10 again. In addition, when the cursor position is shifted to the succeeding line on the text data in the execution of the data processing at step S26 or by the proccessing at step S15, S17, S20 or S21, a text data update processing is executed simultaneously to rewrite the text data in the text memory 13b.

Next, when it is determined that the value of the counter "C" is zero at step S10, the flow goes to step S27 where it is determined whether the flag "F" is set or not, i.e., the scale cursor 200 corresponds to the cursor position or not (whether the value of the "K" register 13c coincides with the value of the "SK" register 13d). When the flag "F" is set and the scale cursor 200 does not correspond to the cursor position, the flow goes to step S23 where a scale cursor shift processing is executed to cause the scale cursor 200 to correspond to the cursor position, further goes to step S24 to reset the flag "F" and then goes to step S10 again.

As described above, according to the next text editing device of the embodiment, when input data is accumulated in the key buffer 13a, the scale cursor shift processing is not executed to cause the scale cursor 200 to correspond to the cursor position, and after all the input data in the key buffer 13a is processed, the scale cursor shift processing is executed.

Therefore, in a state shown in FIG. 5(A), the repeat key 37, for example, is continuously depressed and input data indicating a repeat instruction is accumulated in the key buffer 13a, as shown in FIG. 5(B), the scale cursor 200 is held at its position until the re-input of the character data corresponding to the accumulated repeat instruction is finished and when the re-input of the character data effected in response to the repeat instruction is finished, the scale cursor 200 is shifted to a position corresponding to the cursor position, as shown in FIG. 5(C).

Thus, according to the next editing device, of the embodiment, when data are inputted from the keyboard 1 at a high speed, a period of time necessary to shift the cursor 100 can be shortened by a period of time during which the scale cursor 200 is shifted, whereby the cursor 100 can be shifted at a high speed in response to the data input to enable the high speed input of the data.

Note that the display of an amount of data up to now and an amount of remaining data and the like may be stoplped during the repeat operation in addition to the shift of the scale cursor and they may be displayed after the completion of the repeat operation.

Figure 6A:
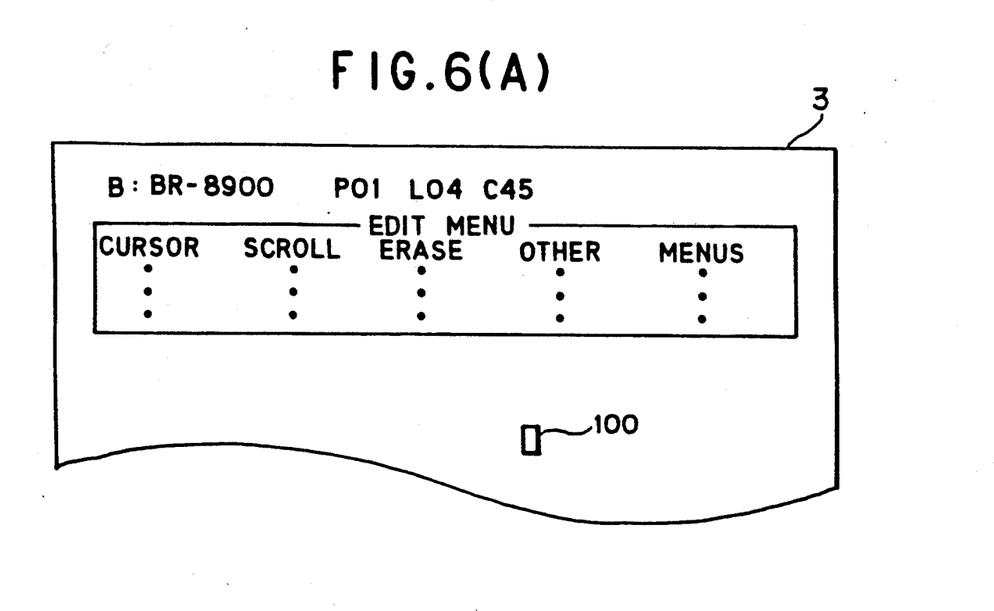
FIGS. 6(A) and 6(B) are another explanatory views of data movement on a display in case the processing shown in FIG. 4 is executed.
Figure 6B:
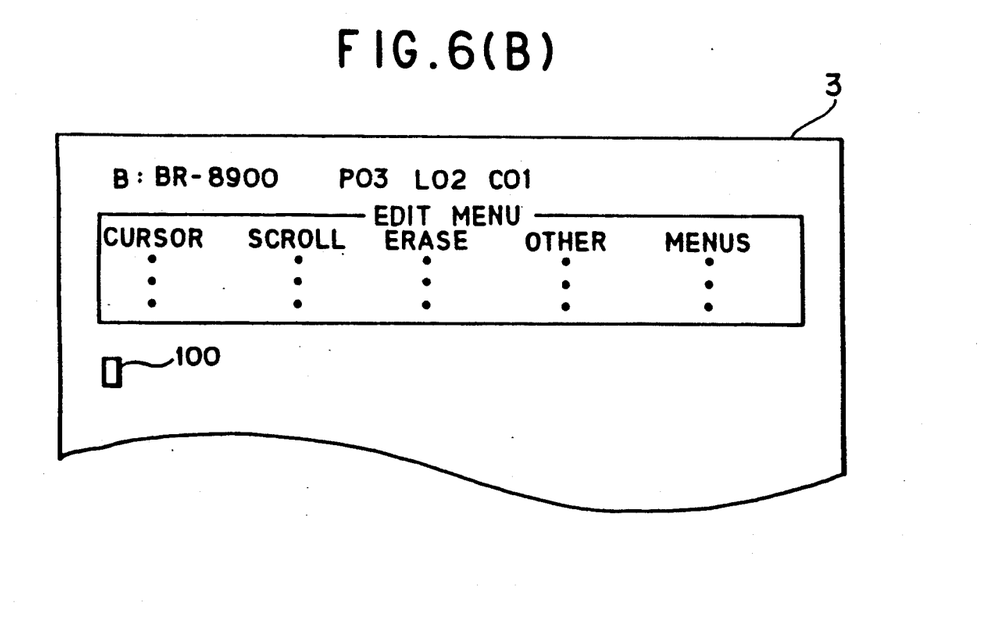

Furthermore, it may be considered that, as shown in FIG. 6(A) and 6(B), page, line and character number indicators for indicating the position at which a cursor 100 is located are changed based uponb a movement of the cursor 100. If a cursor 100 is successively moved at a high speed by a scroll operation and the like from the state shown in FIG. 6(A), the numbers indicating a position at which the cursor 100 is located are not changed till the scroll operation is ceased. After the scroll operation is ceased, the indications are changed so as to indicate a position of the cursor 100. In other words, the indications are discontinuously changed, similar to the embodiment described above.

Further, an another embodiment according to this present invention will be described later with reference to FIG. 7(A) through 7(B) and, FIG. 8(A) through 8(C).

Figures 7, 7A:
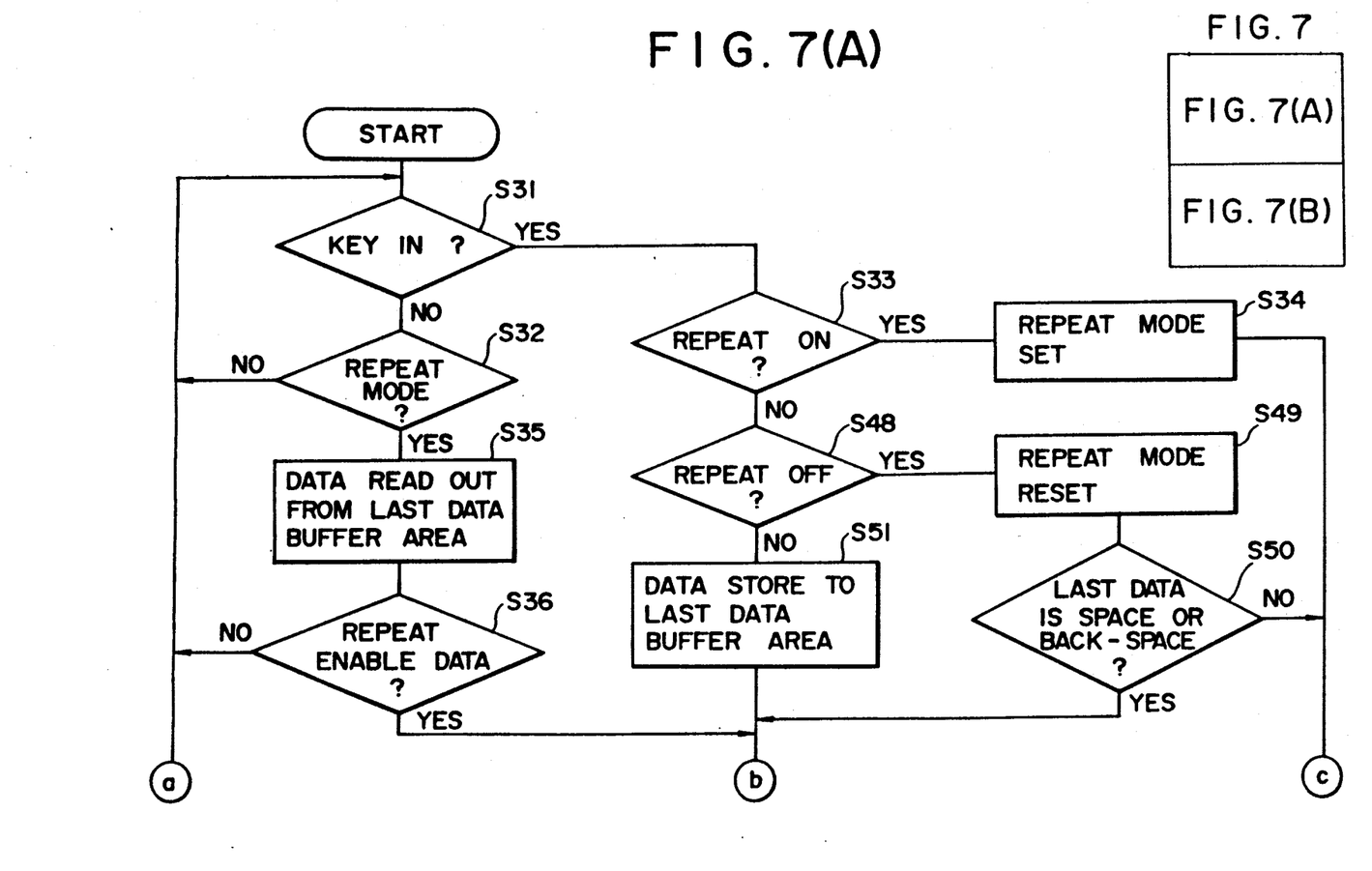
FIGS. 7, 7(A) and 7(B) are another flowcharts of a text preparing processing executed by the electronic control unit of FIG. 2.
Figure 7B:
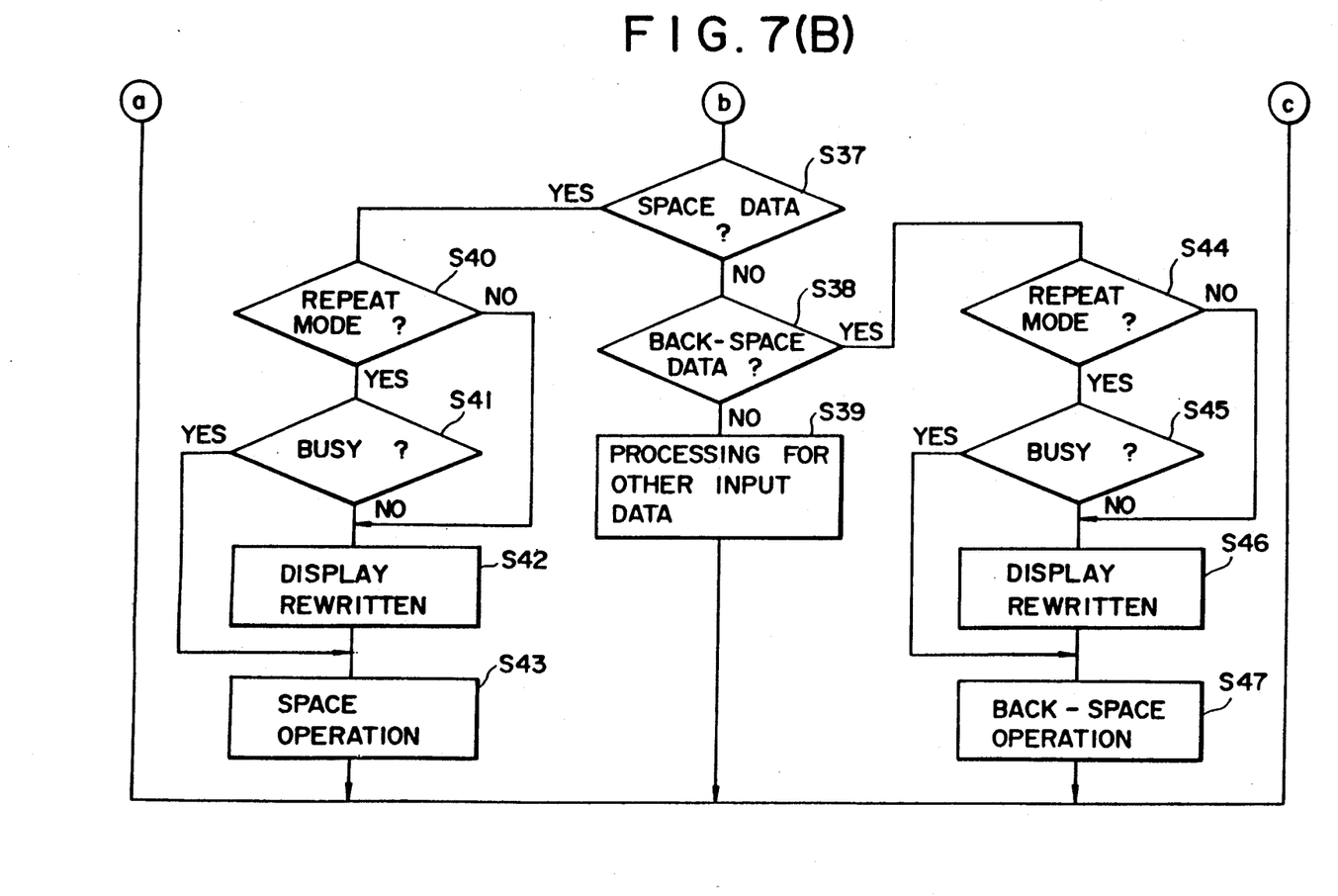

FIG. 7(A) through 7(B) are another flowcharts of a text preparing processing. On the display 3, a numeral representation corresponding to the data stored in a memory is displayed and the number is able to be varied in response to a volume of the data. In step S31, it is determined whether an input operation through the keyuboard 1 is executed or not. If it is determined "No", it is determined whether the present operation mode is repeat mode or not at step S32, and a flow returns to step S31 if the determination at step S32 is "No". In other words, a code input operation by depressing one of keys provided on the keyboard is awaited during a key scan operation composed of step S31 and step S32. After a code input operation is executed, the flow goes to step S33. If the operated key a step S31 is a repeat key 37, the determination at step S33 becomes "YES" and the flow goes back to step S31 after a repeat mode is designated at step S34. After going back to step S31, the determination at step S31 becomes "NO", and the determination at step S32 becomes "YES" because the repeat mode has been already designated at step S34. At step S35, the CPU 11 controls the data having been stored in a last data buffer area of a key buffer 13a so as to be read out, and it is determined at step S36 whether the data read out is one of a plurality of repeatable data or not. If the determination at step S36 is "NO", the flow returns to step S31. If the determination at step S36 is "YES", that is, the data read out from the key buffer 13a is a repeatable data such as a space, one of characters, and the like, it is respectively determined at step S37 and step S38 whether the data is the space or a back space. If the both determination at step S37 and step S38 are "NO", that is, the read out data is the data other than the space and the back space, a character corrsponding to the read out data is displayed on the display 3 at step S39 and the cursor 100 is moved by one step rightward.

If the read out data from the key buffer 13a is the space, the determination at step S37 becomes "YES". The flow goes to step S40 at which the present operation mode is repeat mode or not is determined again, and the flow goes to step S41 because the repeat mode has been already designated at tep S34. The CPU 11 outputs a strobe signal to the CRT controller 20, and determines whether the present state of the display 3 is changeable or not based upon a busy signal sent back from the CRT controller 20. In other words, the numeral representation is able to be varied in case that the busy signal is not outputted from the CRT controller 20 because an absence of the above busy signal indicates that a calculation processing executed in the electronic control unit 10 is smoothly being executed. The CPU 11 controls, at step S42, the numeral representation on the display 3 so as to be rewritten in response to a numeral pattern data corresponding to the stored data and being sent to the display 3 through the data bus.

After rewriting the numeral representation in response to the data sent through the CRT controller 20, a space operation by one step is executed at step S43 and the flow returns to S31. A routine composed of steps S31 through S43 are repeatedly executed and a space repeat operation is executed. If a response for varying the numeral representation is delayed, the busy signal is sent from the CRT controller 20 the CPU 11. In other words, since the flow goes to step S43 from step S41 with skipping over step S42, the numeral representation is not varied.

If the data read out from the last data buffer area of the key buffer 13a is the back space, the flow goes to step S38 from step S37, and the determination at step S38 becomes "YES". The flow goes to step S47 from step S44, similar to steps S40 through S43, and the rewriting operation at step S46 are skipping over in case that the response for varying the numeral representation is delayed.

Next, if the repeat key 37 is depressed again during the repeat mode is designated, the flow goes to step S33 from step S31, the determination at step S33 becomes "NO", and further the determination at step S48 becomes "YES". Further, at step S49, the repeat mode designated at step S34 is released, and it is determined whether the data stored in the last data buffer area is the spacd or the back space or not at step S50. If the determination at step S50 is "YES", the flow respectively goes to step S40 or step S44 through step S37 or step S38. The determination at step S40 or step S44 are respectively becomes "NO" because the repeat mode has been already released at step S479 and the numeral reprsentation is varied at step S42 or step S46. Finally, at step S43 or step S47, the space operation or the back space operation is executed. Therefore, the operation is exactly able to know the volume of the data stored in the memory or the volume of the data capable of being stored when the sapce repeat operation is ceased.

If a key operation corresponding to a key other than the repeat key 37 is executed during the key scanning operation composed of step S31 and step S32, the determinations at step S33 and S48 are respectively becomes "NO", and a processing corresponding to the key operation at step S31 is executed at step S39 after the data corresponding to the key operation is stored into the last data buffer area of key buffer 13a at step S51 and the "NO" determination is executed at step S37 and step S38.

Figure 8A:
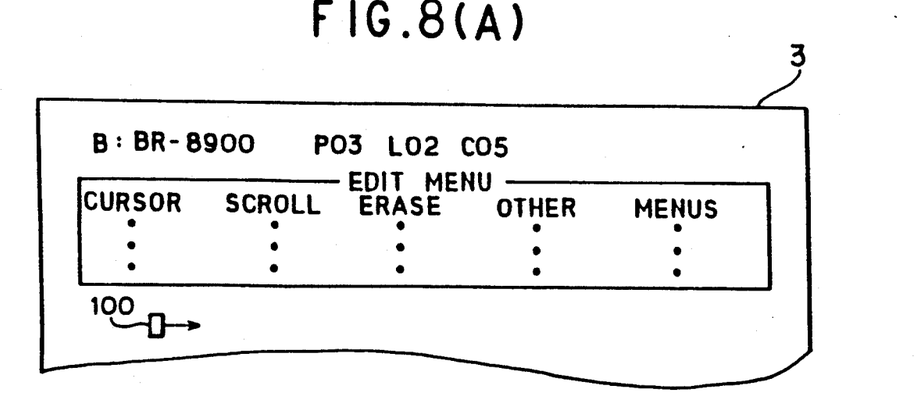
FIGS. 8(A) through 8(C) are explanatory views of data movement on a display in case the processing shown in FIG. 7 is executed.
Figure 8B:
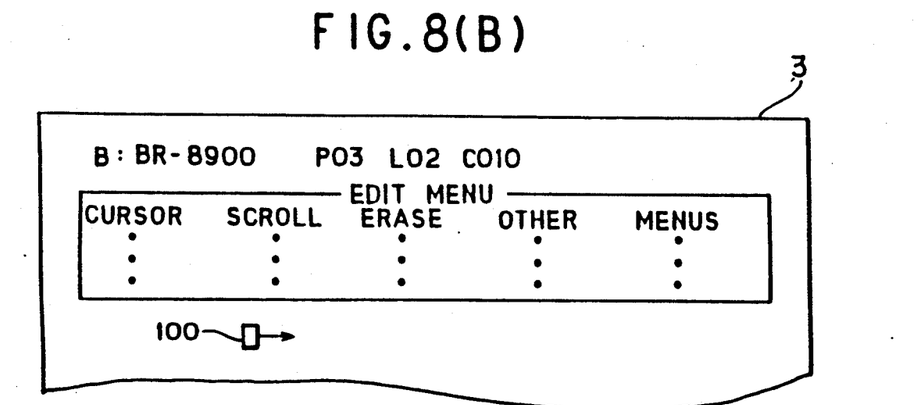
Figure 8C:
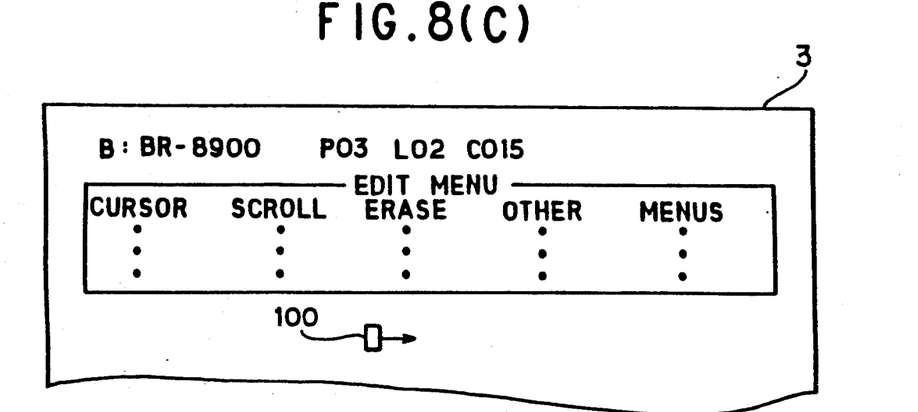

When the above operations are executed, as shown in FIG. 8(A) through 8(C), the numeral representation of the character numeral is discontinuously varied in response to a movement of the cursor 100 by a successive input operation of space data. In FIG. 8(A), the cursor is located at a position corresponding to the seventh character position, a numeral representation remains "5" during a moving operation based upon a successive space data inputting operation. The numeral representation corresponding to the character numeral is discontinuously varied, as shown in FIG. 8(B) and 8(C), at intervals of time corresponding to the five step movement of the cursor 100.

Further, an operation in case that the repeat mode is designated by depressing the repeat key 37 is described in the above embodiment. It is possible to vary a numeral representation discontinuously in case that a successive depression of the space key 32, that is, a self-repeat function, is executed.

The repeat mode is designted when the repeat key 37 is operated and released when the repeat key 37 is operated again in the above embodiment, it may be considered that the repeat mode is designated only when the repeat key 37 is continuously depressed.

What is claimed is:

1. A text editing device comprising input means for inputting character data, represent means for representing characters in response to the inputted data, input position designate means for arbitrarily designating the position at which a character data is to be inputted on said represent means, and means for moving said input position designated by said input position designate means on said represent means, said text editing device further comprises:

relational data represent means for representing relational data having a predetermined relationship with said input position designated by said input position designate means;

first control means for controlling the relational data represented by said relational data represent means so as to be updated in response to said move means changing said input position; and second control means for controlling the relational data represented by said relational data represent means so as not to be updated if said input position is successively moved by said move means at intervals of time less than a predetermined value.

2. The text editing device according to claim 1 wherein said relational data comprises a scale representation corresponding to horizontal positions of said represent means and a scale cursor movable in response to the movement of said input position designated by said input position designate means.

3. The text editing device according to claim 1 wherein said relational data comprises a page representation, a line representation and a character numeral representation of a text data including the inputted character data, said each representation representing the input position designated by said input position designate means.

4. The text editing device according to claim 2 which further comprises print means for printing at least the contents of the data represented on said represent means and wherein a scale unit of said scale representation is corresponding to a printing pitch of said print means.

5. The text editing device according to claim 1 wherein said second control means further controls the relational data represented by said relational data represent means so as to be the data corresponding to the input position having been successively moved at intervals of time less than said predetermined value by said move means.

6. The text editing device according to claim 1 wherein said second control means controls the relational data so as not to be varied in case that said input position is successively moved by an instruction of a repeat input code being inputted through said input means and having a function for successively inputting the data at an intervals of time less than said predetermined value.

7. The text editing device according to claim 6 wherein said data successively inputted by said repeat input code is corresponding to a space.

8. A text editing device comprising input means for inputting character data, represent means for representing characters in response to the inputted data print means for printing at least the contents of the data represented on said represent means, cursor position designate means for arbitrary designating the cursor position at which a character data is to be inputted on said represent means, and move means for moving said cursor with each data input operation executed by said input means on said represent means, said text editing device further comprises:

scale represent means for representing a scale corresponding to horizontal positions of said represent means, a scale unit of said scale corresponding to a printing pitch of said print means;

scale cursor move means for moving a scale cursor being horizontally movable represented with said scale in response to a movement of said cursor executed by said move means; and control means for controlling the scale cursor represented with said scale so as not to be moved in case that said cursor is successively moved at an intervals of time less than a predetermined value by said move means.

9. The text editing device according to claim 8 wherein said control means controls the scale cursor so as not to be varied in case that said cursor is successviely moved by an instruction repeat input code being inputted through said input means and having a function for successively inputting the data at an intervals of time less than said predetermined value.

10. The text editing device according to claim 9 wherein said data successively inputted by said repeat input code is corresponding to a space.

11. A text editing device comprising input means for inputting character data, represent means for representing characters in response to the inputted data, cursor position designate means for arbitrary designating the cursor position at which a character data is to be inputted on said represent means, and memory means for storing the data inputted through said input means, said text editing device further comprises:

means for moving said cursor on said represent means with each data input operation executed by said input means;

data volume represent means for numerically representing one (a) a volume of the data stored in a part of said memory means corresponding to the line on which said cursor is located or (b) a volume of the data capable of being stored in said part of said memory means;

first control means for controlling said representation of said data volume represent means so as to be updated in response to movement of said cursor responsive to an input operation executed by said input means; and second control means for controlling said volume of the data represented by said data volume represent means so as to be discontinuously varied at an interval of time corresponding to a predetermined number of moving operations of said cursor if the cursor is moved faster than the numerical representation of said data volume represent means is varied.

12. A text editing device comprising input means for inputting character data, represent means including at least two represent areas, one of said represent areas displaying characters in response to inputted data, cursor position designate means for arbitrarily designating the cursor position at which a character data is to be inputted on said one of said represent areas, means for moving said cursor from a position designated by said cursor position designate means, said text editing device further comprises:

first represent control means for representing (a) relational data on another of said represent areas, said relational data being movable in response to movement of said cursor; and second represent control means for controlling said relational data so as not to be moved in case said cursor is successively move at intervals of time less than a predetermined value.

13. Text editing device according to claim 12 wherein said relational data comprises a scale representation corresponding to horizontal positions of the other of said represent area and a scale cursor movable in response to a movement of said cursor.

* * * * *